United States Patent
Sawaguchi et al.

(10) Patent No.: US 7,144,461 B2
(45) Date of Patent: Dec. 5, 2006

(54) METHOD OF REMOVING ACID COMPONENT IN DETERIORATED ACETATE FILM

(75) Inventors: Takashi Sawaguchi, Tokyo (JP); Shoichiro Yano, Tokyo (JP); Yoshitaka Morimatsu, Tokyo (JP); Mitsuru Sakaki, Tokyo (JP)

(73) Assignees: Nihon University, Tokyo (JP); Kokusai Microfilm Co., Inc., Tokyo (JP)

( * ) Notice: Subject to any disclaimer, the term of this patent is extended or adjusted under 35 U.S.C. 154(b) by 341 days.

(21) Appl. No.: 10/485,383

(22) PCT Filed: Jan. 15, 2004

(86) PCT No.: PCT/JP2004/000232

§ 371 (c)(1),
(2), (4) Date: Jan. 30, 2004

(87) PCT Pub. No.: WO2004/096899

PCT Pub. Date: Nov. 11, 2004

(65) Prior Publication Data

US 2006/0054185 A1    Mar. 16, 2006

(30) Foreign Application Priority Data

Apr. 28, 2003  (JP) .............................. 2003-123828

(51) Int. Cl.
*C23G 1/00*       (2006.01)

(52) U.S. Cl. .............................. 134/3; 134/26; 134/41; 134/42

(58) Field of Classification Search .................... 134/3, 134/26, 41, 42

See application file for complete search history.

(56) References Cited

U.S. PATENT DOCUMENTS

| | | | | |
|---|---|---|---|---|
| 1,925,564 A | * | 9/1933 | Murray, Jr. et al. | .............. 8/102 |
| 2,332,169 A | * | 10/1943 | Robbins | ...................... 427/333 |
| 2,952,880 A | * | 9/1960 | Rossin et al. | ............... 427/354 |
| 2,953,464 A | * | 9/1960 | Rossin et al. | ............... 264/187 |
| 3,099,584 A | * | 7/1963 | Walsh | ........................... 134/1 |
| 4,098,996 A | * | 7/1978 | Ryan et al. | ................... 536/57 |

FOREIGN PATENT DOCUMENTS

| JP | 2002-179819 A | 6/2002 |
|---|---|---|
| JP | 2003-171485 A | 6/2003 |

OTHER PUBLICATIONS

Computer Translation of JP 2003-171485, Namita Yoshiyuki.*
N.S. Allen et al. J. Photogr. Sci. 36, 194-198 (1988).

* cited by examiner

*Primary Examiner*—Sharidan Carrillo
(74) *Attorney, Agent, or Firm*—Wenderoth, Lind & Ponack, L.L.P.

(57) ABSTRACT

There is provided a method of removing acids from the surface and interior of an acetate film produced by deterioration during storage. Such methods are characterized by extracting and removing the acids from the surface and interior of the acetate film, and the extraction treatment includes solvent extraction or evacuation (heating). This method suppresses the deterioration process in the storage of the acetate film.

6 Claims, 1 Drawing Sheet

TG MEASUREMENT RESULTS: UNTREATED FILM AND FILM AFTER 2 HOURS TREATMENT AT 100°C

METHOD OF REMOVING ACID COMPONENT IN DETERIORATED ACETATE FILM

TECHNICAL FIELD

This invention relates to a method of removing acids produced by deterioration from the surface and particularly the interior of an acetate film during storage of the film. It further relates to the use of this method to suppress the deterioration process in a developed acetate film when the film is stored.

BACKGROUND ART

Cellulose acetate films (which may be referred to as "acetate film" or "cellulose acetate film") are widely used as a film base for information storage due to their stability and long-term storage capacity (e.g., N. S. Allen et al, J. Photogr. Sci. 36, 194–198, 1988).

However, recently, there has been a problem in that, depending on the way the film is stored, the deterioration progresses more seriously than expected. As one of the reasons for this deterioration process, the presence of free (released) acids (especially acetic acid) resulting from decomposition of the film base has been mentioned. In particular, it was found that when these free acids exceeded a specific value (threshold value), the deterioration was accelerated rapidly. This phenomenon is referred to as "vinegar syndrome", and is thought to be a kind of auto-catalyzed hydrolysis reaction by acid.

Although methods have been proposed to solve this deterioration problem by washing the film with water or an alkaline solution and drying, or neutralizing with ammonia gas, deterioration was not sufficiently suppressed, and the qualities of the film were spoiled, which was problematic.

DISCLOSURE OF THE INVENTION

It is an object of this invention to provide a method of removing acids on the surface and in the interior of an acetate film due to deterioration of the film in storage.

It is also an object of the invention to use this method and to provide a method of suppressing the deterioration process in a developed acetate film when the film is stored.

The present inventors found that during the storage of a developed microfilm having an acetate film base (for example, which may be referred to hereafter as "cellulose triacetate" or "TAC"), deterioration is more rapid than would normally be expected and that as a result, a large amount of acids such as acetic acid was produced, not only on the film surface but also in the interior of the film base, and that by removing free acids not only from the film surface but also from the interior of the film base to lower the acidity to less than a specific value, the deterioration process could substantially be controlled, and thus arrived at this invention.

More specifically, this invention is characterized in that it provides a method of removing acids from a deteriorated acetate film, the method comprising extracting and removing acids not only from the surface but also from the interior of the deteriorated acetate film so that the acidity falls to preferably less than a predetermined threshold value (e.g., 0.5).

Particularly, this invention is characterized in that it uses carbon dioxide in the supercritical state (or subcritical) as a solvent for extraction.

This invention is also characterized in that it comprises evaporating and removing any remaining acids (any acids which may be present) by reducing pressure (evacuating) and/or heating after the solvent extraction treatment.

This invention is also characterized in that it comprises evaporating and removing acids by evacuating and/or heating the deteriorated cellulose acetate film. Preferably, it is characterized that the acidity is thus adjusted to be less than 0.5.

This invention further relates to a method of suppressing the deterioration process in a developed acetate film due to acid by removing acids from the surface and interior of the developed acetate film, using the method described above, preferably to make the acidity less than 0.5.

BEST MODE FOR CARRYING OUT THE INVENTION

Figure 1:
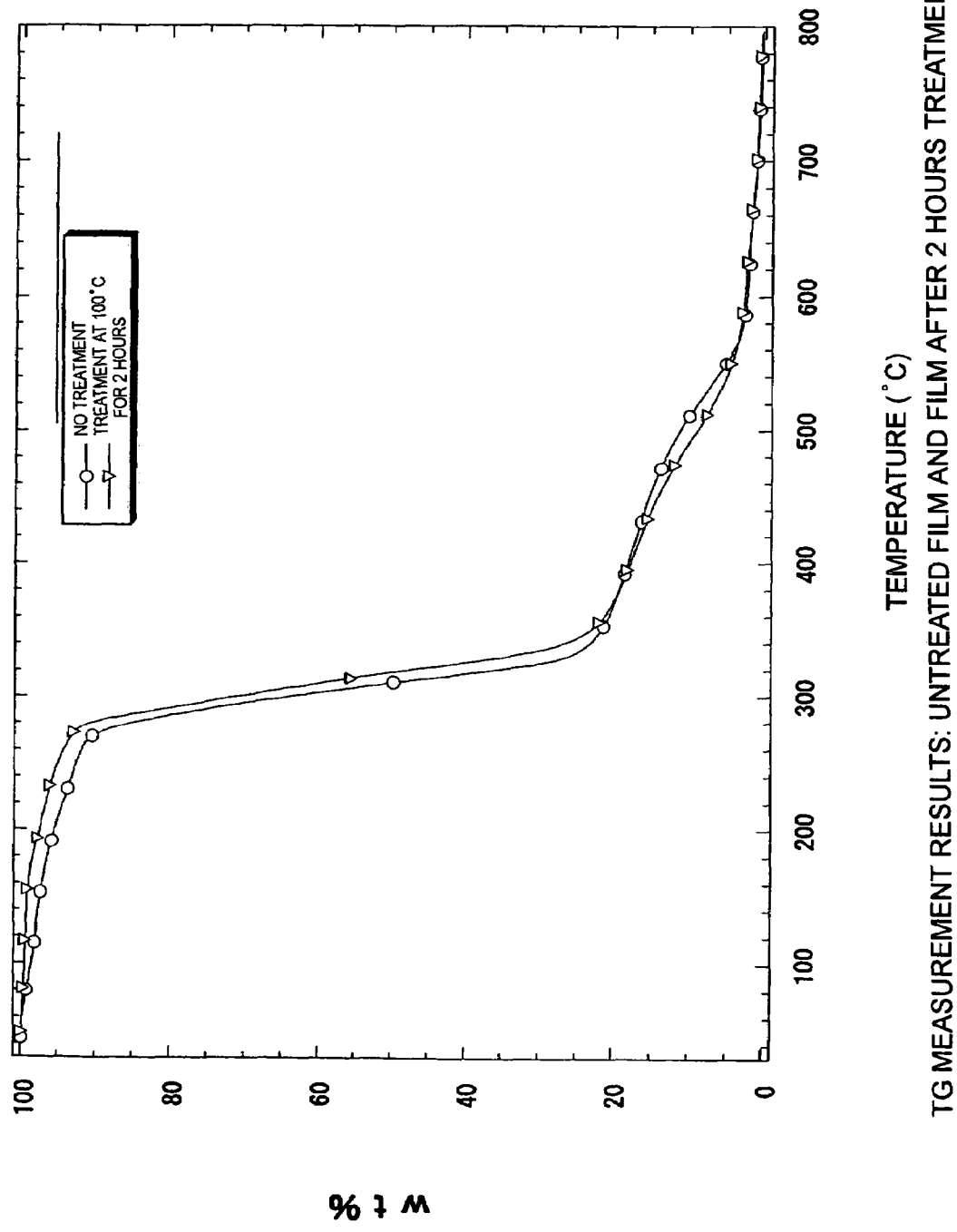
FIG. 1 shows TG curves for a deteriorated film prior to treatment, and after 2 hours treatment at 100° C.

Hereafter, this invention will be described in detail with reference to its embodiments.

The term "acetate film" as used herein means various film base materials which have undergone esterification treatment by acetate. This esterification is a normal triesterification and then a cellulose triacetate film is specifically mentioned. When such a film deteriorates under ordinary storage conditions, the acetate is hydrolyzed and produces acids (for example, acetic acid). The shape of the acetate film is not particularly limited; for example, film or sheet may either be usable. It maybe wound on a reel, or extended. A majority of acetate films are stored in a condition of being wound on a reel (made of resin). Desirably, the method of removing acids according to this invention should be practiced as such state.

The term "developed acetate film" as used herein means a microfilm of acetate film or the like whereon information has been developed as images to store the information. Therefore, the amount and type of this information are not limited in any way. Examples are character, or image and photographic information. The information may include binary data such as black and white, grayscale or color data.

The term "deterioration" as used herein means discoloration/darkening, mold, sticking/film surface peeling, cracks/fissures and microscopic blemishes which occur under ordinary storage conditions for acetate films (including developed acetate films). Particularly remarkable phenomena are an acid (vinegary) odor, waviness of the film edges, stickiness, white powder deposits and destruction of the base. Here, the "acid odor" is due to the release of acids accompanying the deterioration.

The term "more rapid deterioration than would normally be expected" as used herein, means, for example, the condition that as the acidity exceeds or is close to the threshold at which the "vinegar syndrome" occurs, the deterioration is different from the gradual deterioration which is expected to occur under storage conditions of low humidity and low temperature (e.g., 30% RH, 20° C.) which are appropriate for storage of the acetate film. In other words, the substantial suppression of the deterioration process means control of the progress of automatic accelerative deterioration due to the "vinegar syndrome", and does not mean the complete prevention of normal deterioration.

The term "acidity" as used herein means a value measured based on ANSI Standard IT 9.1-1992.

The term "acid(s)" as used herein are substances having an acid odor released by the deteriorated acetate film, including for example, acetic acid, lactic acid, propionic acid or mixtures thereof.

(Method of Removing Acids from Deteriorated Acetate Film: No. 1)

This invention is characterized in that acids are extracted and removed not only from the surface but also from the interior of the deteriorated acetate film. As a result, the acids are removed to such an extent that the acidity falls to less than a predetermined threshold value.

The threshold value of acidity is taken to be about 0.5. The usual acceleration test that is well known in the art can be used for calculation of this threshold value. The term "extraction of acids" as used herein means the extraction and removal of free acids, not only on the surface but also in the interior of the film, without impairing the qualities of the film (in particular, in the case of a developed film, this includes the image). Therefore, after extraction, the amount of acids, not only on the surface but also in the interior of the film, is less than a specific value (a threshold value below which the "vinegar syndrome" does not occur).

The specific method of removing acids from a deteriorated acetate film according to this invention includes extracting the acids by solvent extraction treatment. Herein, solvent extraction treatment means displacing to a solvent phase, extracting and removing free acids not only from the surface but also from the interior of the film by bringing the deteriorated film into contact with a specific solvent. The solvent which can be used herein is not particularly limited if it can dissolve part of the acids to be extracted without impairing the qualities of the film or the developed image. Examples of such solvents are various organic and inorganic solvents. As a preferred example of the organic solvent there is mentioned a solvent in a supercritical (or subcritical) state. As a particularly preferred example, there is mentioned carbon dioxide in a supercritical (or subcritical) state, which may be referred to as "supercritical carbon dioxide in this specification.

The extraction conditions are not particularly limited provided they do not impair the qualities of the film or the developed image. In order to set a suitable temperature, pressure and time for a given extracting solvent, the acidity after extraction is measured, and arranged to be below a set threshold value (e.g., 0.5).

When supercritical carbon dioxide is used as the extraction solvent and the solvent extraction treatment is carried out on a deteriorated acetate film in a condition of being wound on a reel made of resin, the reel itself may be adversely affected depending on the material of the reel. This brings out the disfiguration, discoloration or coloration of the reel. If the material of the reel is a metal, the adverse effects will not result. Therefore, a particularly preferred embodiment of this invention is characterized in that the solvent extraction treatment with supercritical carbon dioxide is carried out on a deteriorated film wound on a metal reel. In this case, it requires that the film be rewound on the metal reel from a condition of being wound on a resin reel which is the ordinarily storage state.

(Method of Removing Acids from Deteriorated Acetate Film: No. 2)

In a specific method of removing acids from a deteriorated acetate film according to this invention, volatile acids are removed not only from the surface but also from the interior of the film by evacuation treatment.

If required, evacuation together with heating is preferably performed. The pressure, temperature and time used for this treatment are not particularly limited provided that the qualities of the film or developed image are not impaired. To set the temperature, pressure and time appropriately for this treatment, the acidity after treatment may be measured, and arranged to be below a predetermined threshold value (for example, 0.5). In general, a lower pressure is preferred. An ordinary rotary type of vacuum pump or ordinary diffusion type of high vacuum pump maybe used. Heating is preferably performed within a range which does not impair the qualities of the film. If required, treatment is preferably performed while passing an inert gas, such as nitrogen or argon.

The extent of evacuation and the temperature range to be applied maybe suitably selected according to the storage state and shape of the deteriorated film. If the storage state of the deteriorated film is poor and there is a large amount of acids, it is preferred to lower the pressure as much as possible, allow sufficient time to achieve the required acidity, and perform treatment at a suitable temperature. For this purpose, it is preferred to measure the physical properties of the deteriorated film prior to treatment so as to set the optimum treatment conditions.

Specifically, the type and amount of volatile acids, and the upper limit of temperature applied, can easily be determined by TG or DMA thermometric analysis measurement.

(Method of Removing Acids from Deteriorated Acetate Film: No. 3)

Additionally, in a specific method of removing acids from a deteriorated acetate film according to this invention, the first method (i.e., solvent extraction treatment) and the second method (i.e., evacuation/heating) can be combined for use. This method includes extracting and removing the acids by solvent not only from the surface but also from the interior of the film and thereafter removing further a trace amount of acids (which may remain) by reducing pressure and/or heating according to the second method.

(Method of Suppressing Deterioration Process Due to Acids in Developed Acetate Film)

By using the acid removal method according to the present invention described above, it is possible to suppress the state where a developed acetate film stored for a fixed period is affected by the "vinegar syndrome," and deteriorates rapidly as a result. Therefore, after performing treatment according to this invention, it becomes possible to store the film not in the "vinegar syndrome" state, but under ordinary storage conditions, and for the expected storage period.

EXAMPLES

Hereafter, this invention will be described based on specific examples, but this invention is not limited to these examples.

Example 1

Extraction Treatment with Supercritical Carbon Dioxide

Deteriorated acetate film with acid odor (1.0049 g, [0.140×34.00×157.00 mm]) was sampled in a supercritical cell (diameter 4 cm, length 6 cm), and supercritical extraction was performed at 40° C. and 9.0 MPa ($CO_2$) for 24 hours.

The film was then taken out, and vacuum-dried at 30° C. to constant weight.

When the extracted ingredients were collected by trapping a gas mixture ($CO_2$ and extracted ingredients) with deuteriochloroform when pressure was reduced to normal pressure inside the supercritical cell.

It was found that by supercritical extraction, the weight of the acetate film decreased. At 40° C. and 9.0 MPa for 24 hours the film decreased in weight from 1.0049 g to 0.9722 g, and 3.3 wt % was extracted.

The extracted ingredients were analyzed as follows.

The molecular structures of the extracted ingredients were analyzed by $^1$H-NMR and $^{13}$C-NMR. From $^1$H-NMR, a signal was observed around 2.1 ppm due to the hydrogen of the methyl group of $CH_3CO_2H$ (acetic acid), and a signal was observed around 11.2 ppm due to the carboxyl group hydrogen. Also from $^{13}$C-NMR, a signal was observed around 26 ppm due to the methyl group carbon in $CH_3COOH$, and a signal was observed around 175 ppm due to the carboxyl group carbon.

From $^1$H-NMR and $^{13}$C-NMR, as signals other than those due to acetic acid are the noise level, it was understood that the main ingredient is acetic acid (the extraction gas had the odor of acetic acid).

The IR spectrum of the film was measured, but no difference in structure before and after supercritical extraction was observed.

From the above experimental results, the unit structure and 3.3 wt % weight reduction may be interpreted as follows. The hydrolysis components of trisubstituted cellulose acetate units (disubstituted cellulose acetate units+ acetic acid) and the disubstituted cellulose acetate units were respectively 306.09 g/mol and 246.07 g/mol. For this reason, if acetic acid is desorbed from 1 mol of (disubstituted cellulose acetate units+acetic acid), the weight decreases by 19.61 wt % from the cellulose units. From the $^1$H-NMR, almost 100% of the extracted ingredients were acetic acid, and as there was a 3.3 wt % weight reduction, it is thought that one acetic acid has desorbed from 6.2 monomer units (=5.2+1).

After treatment, the film had almost no acetic acid odor and the developed image was not spoiled. Also, it was found that there was no significant change in the thermometric analysis and dynamic physical properties of the film resulting from the treatment, and only volatile acids were removed.

The extraction treatment with supercritical carbon dioxide of a film which had not deteriorated was performed under the same conditions as those of Example 1. The extracted acetic acid was a trace amount.

Examples 2–23

In a manner similar to the procedure described in Example 1, the extraction treatment of a deteriorated acetate film was performed, except that treatment temperature, pressure and time were variously changed in the supercritical treatment. The weight change of the sample film before and after treatment together with the treatment conditions is shown in Table 1.

After treatment, these film samples also had almost no acetic acid odor and the developed images were not spoiled. Also, it was confirmed that there was no significant change in the thermometric analysis and dynamic physical properties of the film resulting from the treatment and that only volatile acids were removed under the treatment conditions as described.

TABLE 1

| A | B | C | D | E | F | G |
|---|---|---|---|---|---|---|
| No.2 | 32 | 18 | 24 | 155.73 | 141.59 | 9.079 |
| No.3 | 32 | 7.4 | 24 | 155.87 | 142.94 | 8.3 |
| No.4 | 90 | 18 | 24 | 157.61 | 140.88 | 10.6 |
| No.5 | 90 | 18 | 3 | 157.5 | 145.6 | 7.56 |
| No.6 | 90 | 18 | 1 | 155.82 | 145.23 | 6.79 |
| No.7 | 60 | 18 | 20 | 158.02 | 142.54 | 9.8 |
| No.8 | 60 | 18 | 3 | 157.07 | 145.55 | 7.33 |
| No.9 | 40 | 18 | 3 | 155.85 | 144.51 | 7.28 |
| No.10 | 40 | 18 | 1 | 159.22 | 147.76 | 7.39 |
| No.11 | 40 | 18 | 24 | 156.24 | 141.61 | 9.36 |
| No.12 | 90 | 9 | 24 | 125.08 | 116.05 | 7.26 |
| No.13 | 90 | 9 | 3 | 156.64 | 148.01 | 5.51 |
| No.14 | 90 | 9 | 1 | 153.87 | 144.31 | 6.21 |
| No.15 | 60 | 9 | 6 | 156.95 | 147.51 | 6.01 |
| No.16 | 60 | 9 | 24 | 155.31 | 145.59 | 6.25 |
| No.17 | 60 | 9 | 18 | 153.26 | 142.78 | 6.84 |
| No.18 | 60 | 9 | 3 | 157.46 | 147.48 | 6.34 |
| No.19 | 40 | 9 | 3 | 156.09 | 145.27 | 6.93 |
| No.20 | 40 | 9 | 18 | 155.78 | 143.19 | 8.08 |
| No.21 | 40 | 9 | 0.5 | 159.13 | 151.5 | 4.79 |
| No.22 | 40 | 9 | 1 | 157.71 | 148.49 | 5.85 |
| No.23 | 40 | 9 | 6 | 156.47 | 144.67 | 7.54 |

A: example no.; B: temperature (° C.); C: pressure (MPa); D: treatment time (hr); E: before treatment (mg); F: after treatment (mg); G: decrease rate (wt %)

Example 24

Evacuation Treatment

About 140 mg of a deteriorated film was cut out, placed in a reaction vessel, and this was connected to a vacuum system using an oil diffusion pump as follows. The reaction vessel was maintained by an oil bath at the temperatures shown below. After reaching a sufficient degree of vacuum (about $2 \times 10^{-3}$ mmHg), the sample was left for about 1 hour. Subsequently, the bath was removed, nitrogen gas was introduced and the pressure was returned to atmospheric pressure.

The weight change of the sample film before and after treatment is shown in Table 2.

TABLE 2

| temperature (° C.) | before treatment (mg) | after treatment (mg) | decrease rate (wt %) |
|---|---|---|---|
| 40 | 138.31 | 134.82 | 2.52 |
| 65 | 144.21 | 140.27 | 2.73 |
| 90 | 141.30 | 136.59 | 3.33 |

There was almost no acetic acid odor from the film after treatment, and the developed image was not spoiled. Also, it was found that there was no significant change in the thermometric analysis and dynamic physical properties of the film resulting from the treatment, and only volatile acids were removed by the treatment.

Example 25

Evacuation Treatment

About 140 mg of a deteriorated film was cut out, placed in a reaction vessel, and this was connected to a vacuum system using an oil diffusion pump as follows. The reaction vessel was maintained by an oil bath at the respective temperatures shown below. After reaching a sufficient degree of vacuum (about $2 \times 10^{-3}$ mmHg), the sample was left for about 1 hour and about 2 hours. Subsequently, the bath was removed, nitrogen gas was introduced and the pressure was returned to atmospheric pressure.

The weight change of the sample film before and after treatment is shown in Table 3.

TABLE 3

| temperature (° C.) | treatment time (h) | before treatment (mg) | after treatment (mg) | decrease rate (wt %) |
|---|---|---|---|---|
| 40 | 1 | 167.01 | 163.15 | 2.37 |
| 40 | 2 | 143.64 | 140.18 | 2.41 |
| 60 | 1 | 123.90 | 120.81 | 2.49 |
| 60 | 2 | 131.61 | 128.11 | 2.66 |
| 100 | 1 | 127.32 | 123.05 | 3.35 |
| 100 | 2 | 140.68 | 135.92 | 3.38 |

For any treatment temperature and time, the film had almost no acetic acid odor. There was no loss at all of the information qualities of the developed image. Also, it was found that there was no significant change in the thermometric analysis TG: thermogravimetric analysis) and dynamic physical properties (DMA: dynamic mechanical analysis) of the film resulting from the treatment, and only volatile acids were removed by the treatment.

Especially from TG measurement of a film processed at 100° C. for 2 hours, it was found that this treatment almost completely removed volatile ingredients (FIG. 1).

Reference Example 1

Evacuation Treatment

For comparison, a developed film with almost no deterioration (no acid odor) was treated in the same manner as above.

The weight change of the sample film before and after treatment is shown in Table 4.

TABLE 4

| temperature (° C.) | treatment time (h) | before treatment (mg) | after treatment (mg) | decrease rate (wt %) |
|---|---|---|---|---|
| 40 | 2 | 123.82 | 122.75 | 0.86 |
| 60 | 1 | 123.78 | 122.76 | 0.86 |

TABLE 4-continued

| temperature (° C.) | treatment time (h) | before treatment (mg) | after treatment (mg) | decrease rate (wt %) |
|---|---|---|---|---|
| 60 | 2 | 115.40 | 114.03 | 1.19 |
| 100 | 1 | 120.54 | 119.08 | 1.21 |
| 100 | 2 | 119.02 | 117.69 | 1.12 |

It was found that this treatment removed the volatile ingredients which were the film surface and contained water.

INDUSTRIAL APPLICABILITY

As described above, according to this invention, acids in a deteriorated acetate film can be removed to a value lower than a predetermined value, not only from the surface but also from the interior of the film. This method also will be able to suppress deterioration of a developed acetate film in the "vinegar syndrome" state which is rapidly deteriorating.

The invention claimed is:

1. A method of removing acids from a deteriorated acetate film, the method comprising removing the acids from a surface and interior of the deteriorated film by solvent extraction with supercritical carbon dioxide under supercritical conditions.

2. The method of removing acids from a deteriorated acetate film according to claim 1, further comprising evaporating and removing any remaining acids by exposing the deteriorated acetate film to pressure reduction and/or heating the deteriorated acetate film after the solvent extraction.

3. The method of removing acids from a deteriorated acetate film according to claim 1 or 2, wherein the deteriorated acetate film is wound on a reel.

4. The method of removing acids from a deteriorated acetate film according to claim 3, wherein the reel is made of metal.

5. The method of removing acids from a deteriorated acetate film according to claim 1, wherein the acids are removed so that the acidity of the deteriorated acetate film is less than 0.5.

6. A method of suppressing deterioration in a developed acetate film during storage due to acids released by the film, the method comprising removing the acids from a surface and interior of the developed acetate film by solvent extraction with supercritical carbon dioxide under supercritical conditions.

* * * * *